United States Patent
Kim et al.

(10) Patent No.: US 9,762,785 B2
(45) Date of Patent: Sep. 12, 2017

(54) CAMERA MODULE

(71) Applicant: Samsung Electro-Mechanics Co., Ltd., Suwon-si (KR)

(72) Inventors: Chul Jin Kim, Suwon-si (KR); Soo Cheol Lim, Suwon-si (KR); Byung Woo Kang, Suwon-si (KR); Sung Ryung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/943,914

(22) Filed: Nov. 17, 2015

(65) Prior Publication Data

US 2016/0261778 A1    Sep. 8, 2016

(30) Foreign Application Priority Data

Mar. 2, 2015  (KR) .................. 10-2015-0029202

(51) Int. Cl.
| | |
|---|---|
| *H04N 5/225* | (2006.01) |
| *G02B 27/64* | (2006.01) |
| *G02B 13/00* | (2006.01) |
| *G02B 7/10* | (2006.01) |

(52) U.S. Cl.
CPC ........... *H04N 5/2253* (2013.01); *G02B 7/102* (2013.01); *G02B 13/009* (2013.01); *G02B 27/646* (2013.01); *H04N 5/2252* (2013.01); *H04N 5/2254* (2013.01); *H04N 5/2257* (2013.01)

(58) Field of Classification Search
USPC .......................................................... 396/72
See application file for complete search history.

(56) References Cited

U.S. PATENT DOCUMENTS

| | | | | |
|---|---|---|---|---|
| 6,449,229 B1* | 9/2002 | Kim | ..................... | G11B 7/0933 359/814 |
| 9,151,963 B2* | 10/2015 | Sato | ........................ | G02B 27/64 |
| 2003/0058550 A1* | 3/2003 | Ju | ......................... | G11B 7/0933 359/813 |
| 2006/0077781 A1* | 4/2006 | Yamada | ............... | G11B 7/0932 369/44.14 |
| 2011/0097062 A1* | 4/2011 | Tsuruta | .................. | G02B 7/022 396/55 |
| 2013/0050828 A1* | 2/2013 | Sato | ........................ | G02B 27/64 359/557 |
| 2014/0177056 A1* | 6/2014 | Hayashi | ................. | G02B 7/08 359/557 |

(Continued)

FOREIGN PATENT DOCUMENTS

| | | |
|---|---|---|
| EP | 2 816 403 A1 | 12/2014 |
| JP | 2013-44924 A | 3/2013 |
| JP | 2013-167867 A | 8/2013 |

OTHER PUBLICATIONS

Taiwanese Office Action dated Aug. 23, 2016, in counterpart Taiwanese Application No. 104137112 (6 pages in English, 5 pages in Taiwanese).

*Primary Examiner* — Clayton E LaBalle
*Assistant Examiner* — Linda B Smith
(74) *Attorney, Agent, or Firm* — NSIP Law

(57) ABSTRACT

A camera module includes: a driving part comprising a lens module; a fixed part spaced apart from the driving part; a suspension wire having a first end fixed to the fixed part and a second end fixed to the driving part; and a damper part enclosing at least a portion of the suspension wire.

16 Claims, 4 Drawing Sheets

(56) References Cited

U.S. PATENT DOCUMENTS

2015/0062706 A1* 3/2015 Lim .................. G02B 7/08
                                          359/554
2016/0241787 A1* 8/2016 Sekimoto ............ H04N 5/2257

* cited by examiner

CAMERA MODULE

CROSS-REFERENCE TO RELATED APPLICATION(S)

This application claims the benefit of Korean Patent Application No. 10-2015-0029202 filed on Mar. 2, 2015, in the Korean Intellectual Property Office, the entire disclosure of which is incorporated herein by reference for all purposes.

BACKGROUND

1. Field

The following description relates to a camera module.

2. Description of Related Art

Recently, multi-functional subminiature camera modules have been used in mobile communications terminals such as desktop personal computers (PCs), laptop computers, and the like, in addition to mobile phones such as smartphones.

However, as mobile communications terminals are getting increasingly smaller, mobile communications terminals are significantly affected by slight movement thereof when an image is photographed, and thus image quality may deteriorate. Therefore, image stabilization technology is required to obtain clear images.

When mobile communications terminals are shaken while an image is photographed, an optical image stabilization (OIS) actuator to which an OIS technology is applied may be used to perform an image stabilization function.

The OIS actuator may move a lens module in a direction perpendicular to an optical axis direction. To this end, the OIS actuator uses suspension wires which support the lens module.

However, when a frequency of a driving force of the OIS actuator coincides with a natural frequency of a lens module and a suspension wire, a resonance phenomenon may occur.

Further, when the driving force of the OIS actuator is not applied to a center of the lens module but to a position spaced from the center of the lens module, a rolling moment is generated in the lens module, and thus the lens module may rotate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a camera module includes: a driving part including a lens module; a fixed part spaced apart from the driving part; a suspension wire including a first end fixed to the fixed part and a second end fixed to the driving part; and a damper part enclosing at least a portion of the suspension wire.

The damper part may include a gel.

The damper part may be configured to dampen vibration of the suspension wire.

The camera module may further include a case coupled to the fixed part and enclosing the driving part.

The damper part may be disposed in a space between the fixed part and the case.

The damper part may be disposed in a space enclosed by an outer surface of the fixed part and an inner surface of the case.

The fixed part may include: a frame including a window through which light is transmitted; and a first substrate comprising an image sensor mounted thereon and coupled to the frame.

The first end of the suspension wire may be fixed to the first substrate.

The frame may include an extension part extending in an optical axis direction from the frame, and the damper part may be disposed in the extension part.

The extension part may be spaced apart from the driving part in a direction perpendicular to the optical axis direction.

The extension part may include an accommodating groove which is concave from a side surface of the extension part in a direction perpendicular to the optical axis direction.

The damper part may be disposed in the accommodating groove.

The case may be coupled to the side surface of the extension part, and the accommodating groove may be sealed by the case in the direction perpendicular to the optical axis direction.

The extension part may be disposed in a corner of the frame.

According to another general aspect, a camera module includes: a driving part including a lens module; a fixed part spaced apart from the driving part; a lens driver configured to drive the driving part in a direction perpendicular to an optical axis direction; a suspension wire supporting the driving part; a case coupled to the fixed part and enclosing the driving part; and a damper part disposed in a space provided between the fixed part and the case, and enclosing at least a portion of the suspension wire.

The damper part may include a viscous gel.

The suspension wire may be configured to supply power to the lens driver.

The lens driver may include a first coil configured to receive power to perform an auto-focus or zoom function, a second coil configured to receive power to perform an image stabilization function, and a magnet facing the first coil and the second coil. The suspension wire may be configured to supply power to the first coil.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms will be defined with respect to directions in the following description. As viewed in FIG. 2, an optical axis direction (Z direction) refers to a vertical direction in relation to a lens barrel 211.

Figure 1:
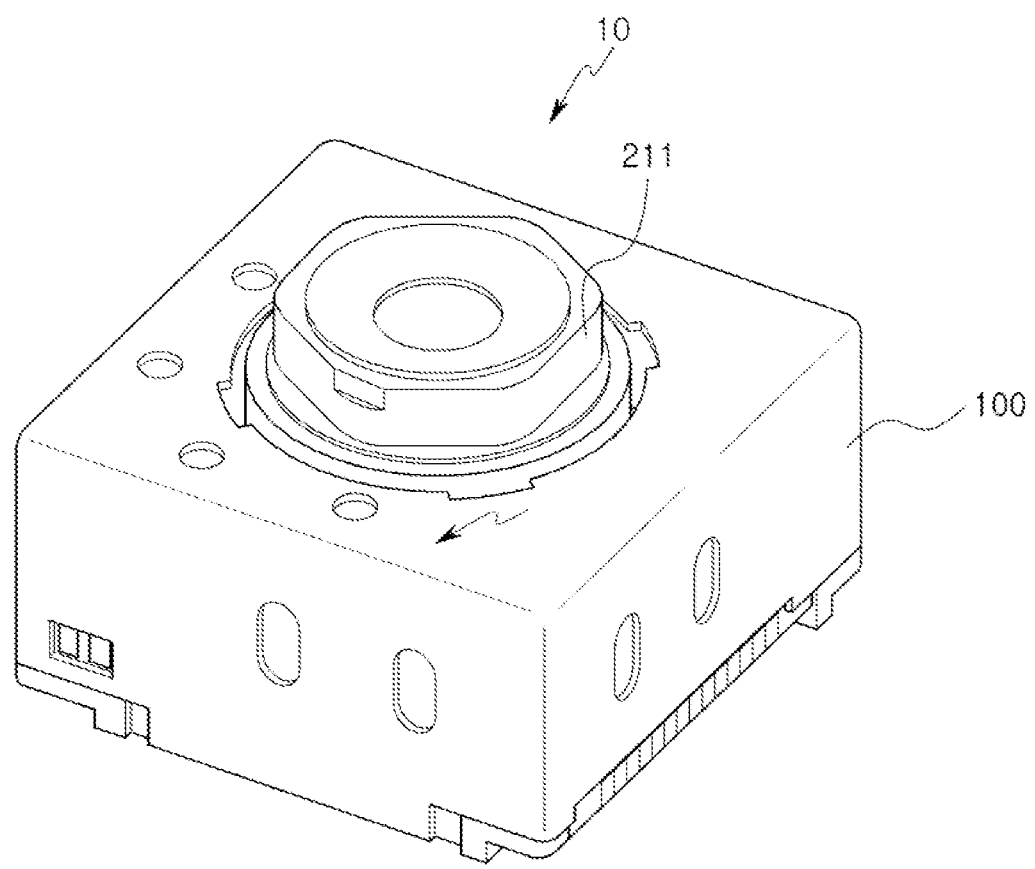
FIG. 1 is an assembled perspective view of a camera module according to an example.
Figure 2:
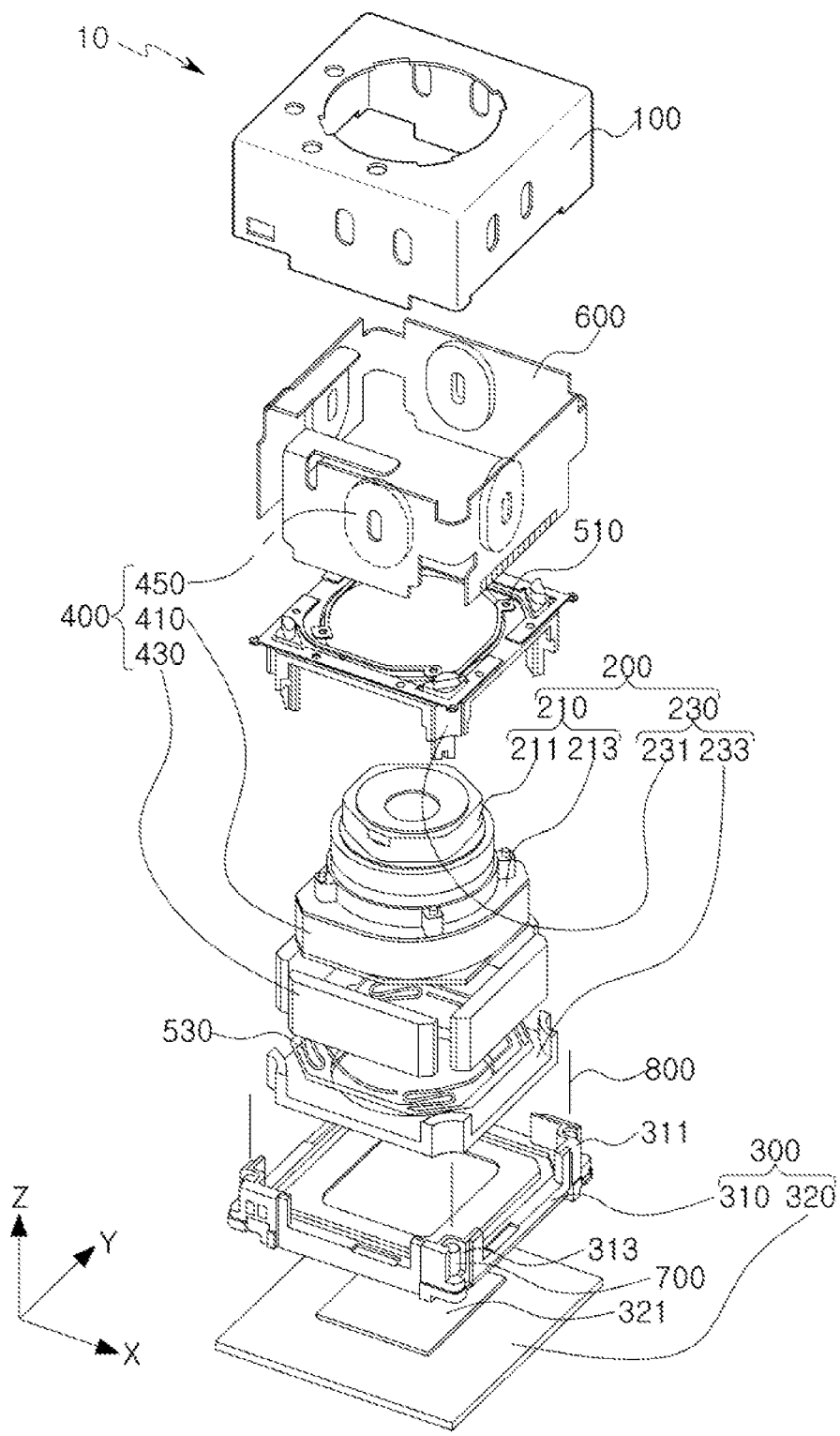
FIG. 2 is an exploded perspective view of the camera module.

FIG. 1 is an assembled perspective view of a camera module 10 according to an example, and FIG. 2 is an exploded perspective view of the camera module 10.

Referring to FIGS. 1 and 2, the camera module 10 includes a driving part 200, a fixed part 300 spaced apart from the driving part 200 in the optical axis direction (Z direction), a lens driver 400 operable to provide driving force to drive the driving part 200, and a case 100 coupled to the fixed part 300.

The driving part 200 includes a lens module 210 and a housing 230 securing the lens module 210 therein.

The lens module 210 includes a lens barrel 211 and a bobbin 213 in which the lens barrel 211 is mounted.

The lens barrel 211 may have a hollow cylindrical shape so that a plurality of lenses (not shown) used to photograph subjects may be disposed therein, and the plurality of lenses may be positioned in the lens barrel 211 along an optical axis.

The plurality of lenses may be stacked as required depending on a design of the lens barrel 211, and each of the plurality of lenses may have optical characteristics such as the same or different reflective indices, or the like.

The lens barrel 211 is coupled to the bobbin 213. For example, the lens barrel 211 is inserted into a hollow of the bobbin 213 to be fixed to the bobbin 213.

The bobbin 213, along with the lens barrel 211, is disposed inside the housing 230 and is configured to be driven inside the housing in the optical axis direction (Z direction) for an auto-focus function.

Further, the housing 230 is configured to be driven in directions (X and Y directions) perpendicular to the optical axis direction (Z direction) for an image stabilization function in a state in which the lens module 210 is disposed inside the housing 230.

The fixed part 300 includes a frame 310 including a window through which light is transmitted, a first substrate 320 coupled to the frame 310, and an image sensor 321 mounted on the first substrate 320.

The frame 310 is spaced apart from the driving part 200 in the optical axis direction (Z direction), and the first substrate 320 is coupled to a lower portion of the frame 310. The case 100 is coupled to the fixed part 300 to enclose the driving part 200, and is configured to shield electromagnetic waves generated when the camera module 10 is driven. That is, electromagnetic waves may be generated when the camera module 10 is driven, and the electromagnetic waves, when externally discharged, may have an influence on other electronic components, thereby causing communications errors or malfunctions.

The case 100 may be formed of a metal material to thereby be grounded to a ground pad (not shown) provided on the first substrate 320. Accordingly, the case 100 may shield electromagnetic waves. Alternatively, when the case 100 is formed of a plastic injection-molded product, a conductive paint may be applied onto an inner surface of the case 100 to shield electromagnetic waves. The conductive paint may be a conductive epoxy, but is not limited thereto. That is, various materials having conductivity may be used as the conductive paint. Further still, instead of using a conductive paint, a conductive film or conductive tape may be attached to the inner surface of the case 100.

The lens driver 400 is operable to drive the lens module 210 in the optical axis direction (Z direction) or to drive the housing 230 in the directions (X and Y directions) perpendicular to the optical axis direction (Z direction). The lens driver 400 includes a first coil 410, a magnet 430, and a second coil 450. The magnet 430 is disposed between the first coil 410 and the second coil 450. As shown in FIG. 2, the magnet 430 may include multiple magnet members and the second coil 450 may include multiple coil members.

First, describing the driving of the auto-focus function, the first coil 410 is wound around the outer surface of the bobbin 213 in one direction, and the magnet 430 is mounted on the housing 230 to face the first coil 410 in the directions (X and Y directions) perpendicular to the optical axis direction (Z direction).

The housing 230 has open sides so that the magnet 430 and the first coil 410 face each other.

For example, the housing 230 includes a first housing 231 and a second housing 233 which are coupled to each other in the optical axis direction (Z direction). The first housing 231 and the second housing 233 may each include a squared support plate having a hollow and pillar members extending in the optical axis direction (Z direction) from each corner of the support plate. Therefore, the magnet 430 is mounted on the open sides of the housing 230 to face the first coil 410 in the directions (X and Y directions) perpendicular to the optical axis direction (Z direction).

The magnet 430 may generate a predetermined magnetic field. When power is applied to the first coil 410, a driving force is generated by an electromagnetic influence between the magnet 430 and the first coil 430. Accordingly, the lens module 210 is moved in the optical axis direction (Z direction) inside the housing by the driving force. The lens module 210 may be moved by the aforementioned operation to perform an auto-focus function or a zoom function.

The housing 230 includes one or more elastic members 510 and 530 that elastically support the bobbin 213. For example, the first elastic member 510 is disposed on the first housing 231 to elastically support the bobbin 213, and the second elastic member 530 is disposed in a lower portion of the second housing 233 to elastically support the bobbin 213.

Next, the driving of the image stabilization function will be described.

The image stabilization function is implemented to compensate for image blurring or video shaking resulted from factors such as movement of a user's hand when the image is photographed or video is recorded. For example, when the user's hand is moved while an image is photographed or video is recorded, a relative displacement is imparted to the housing 230 in the directions (X and Y directions) perpendicular to the optical axis direction (Z direction), thereby performing the image stabilization function.

The second coil 450 faces the magnet 430. For example, the second coil 450 may be provided in a donut shape with a hollow and is mounted on a second substrate 600 attached to an inner surface of the case 100 to face the magnet 430 in the directions (X and Y directions) perpendicular to the optical axis direction (Z direction). In the second substrate 600, a hall sensor (not illustrated) may be mounted in a position adjacent to the second coil 450 to sense a position of the magnet 430.

The magnet 430 generates a predetermined magnetic field. When power is applied to the second coil 450, a driving force is generated by an electromagnetic influence between the magnet 430 and the second coil 450. Accordingly, the housing 230 may be moved in the directions (X and Y directions) perpendicular to the optical axis direction (Z direction) by the driving force.

The lens module 210 is disposed in the housing 230, and thus the lens module 210 is also driven in the directions (X and Y directions) perpendicular to the optical axis direction (Z direction) by the driving of the housing 230. The housing 230 is moved by the operation as described above to perform the image stabilization function.

The magnet 430 is used both for the driving for the auto-focus function and the driving for the image stabilization function. Therefore, in the lens driver 400, a magnet for the driving for the auto-focus function and a magnet for the driving for the image stabilization function are not separately provided. To this end, a surface of the magnet 430 facing the first coil 410 and a surface of the magnet 430 facing the second coil 450 may be magnetized to have different polarities. For example, one surface of the magnet 430 facing the first coil 410 may be magnetized to have an S polarity and the other surface of the magnet 430 facing the second coil 450 may be magnetized to have an N polarity.

A suspension wire 800 is provided to support the driving of the housing 230 in the directions (X and Y directions) perpendicular to the optical axis direction (Z direction). One end of the suspension wire 800 is fixed to the fixed part 300, and the other end of the suspension wire is fixed to the driving part 200. For example, the one end of the suspension wire 800 may be fixed to the first substrate 320, and the other end of the suspension wire 800 may be fixed to the first elastic member 510 of the housing 230. Therefore, the suspension wire 800 may provide a gap between the housing 230 and the frame 310 such that the housing 230 and the frame 310 are spaced apart from each other in the optical axis direction (Z direction). A total number of four suspension wires 800 may be provided and disposed in corners of the frame 310 to support the driving of the housing 230 when the image stabilization function is performed.

Additionally, the suspension wire 800 is configured to supply power to the first coil 410. One end of the suspension wire 800 may be connected to the first substrate 320, the other end thereof may be connected to the first elastic member 510, and the first elastic member 510 may be connected to a lead wire of the first coil 410. Accordingly, the first coil 410 is configured to receive power through the suspension wire 800.

Figure 3:
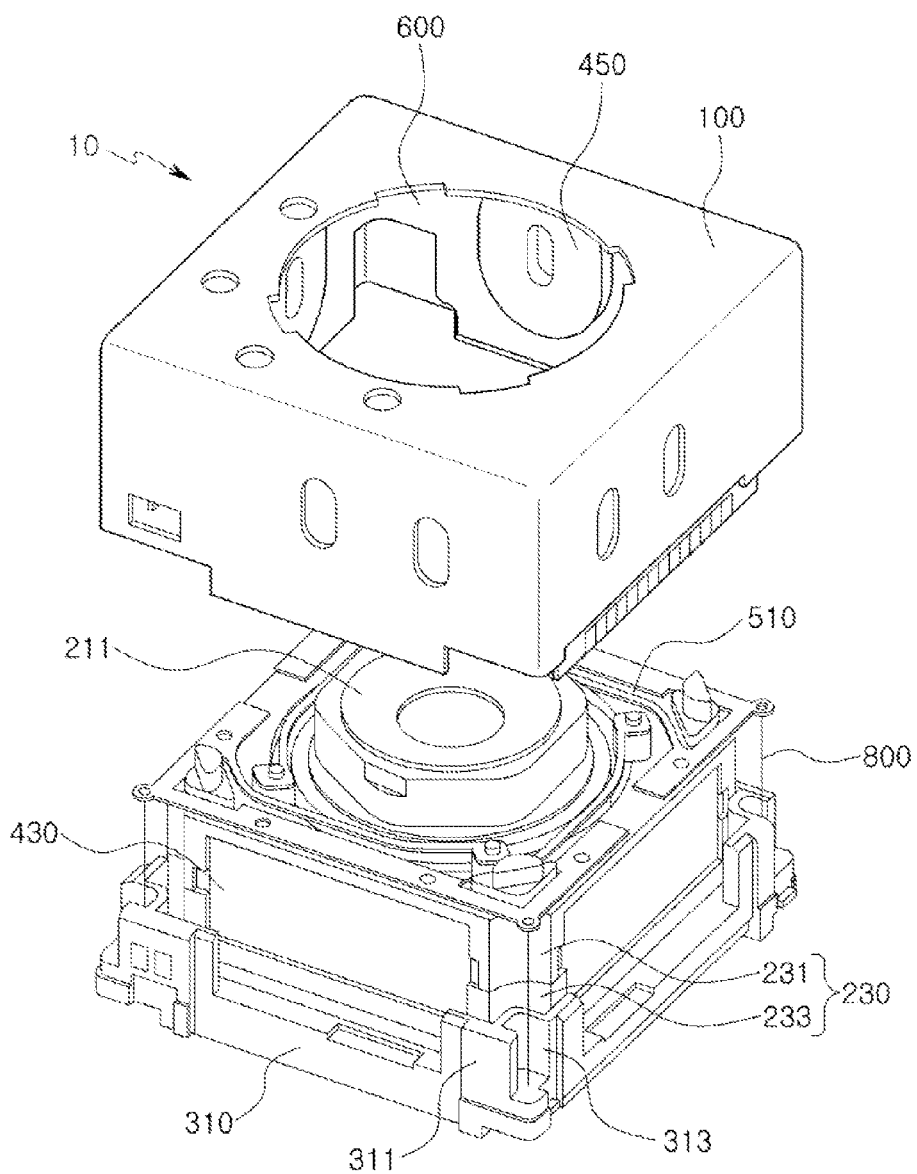
FIG. 3 is a partially assembled exploded perspective view of the camera module.
Figure 4:
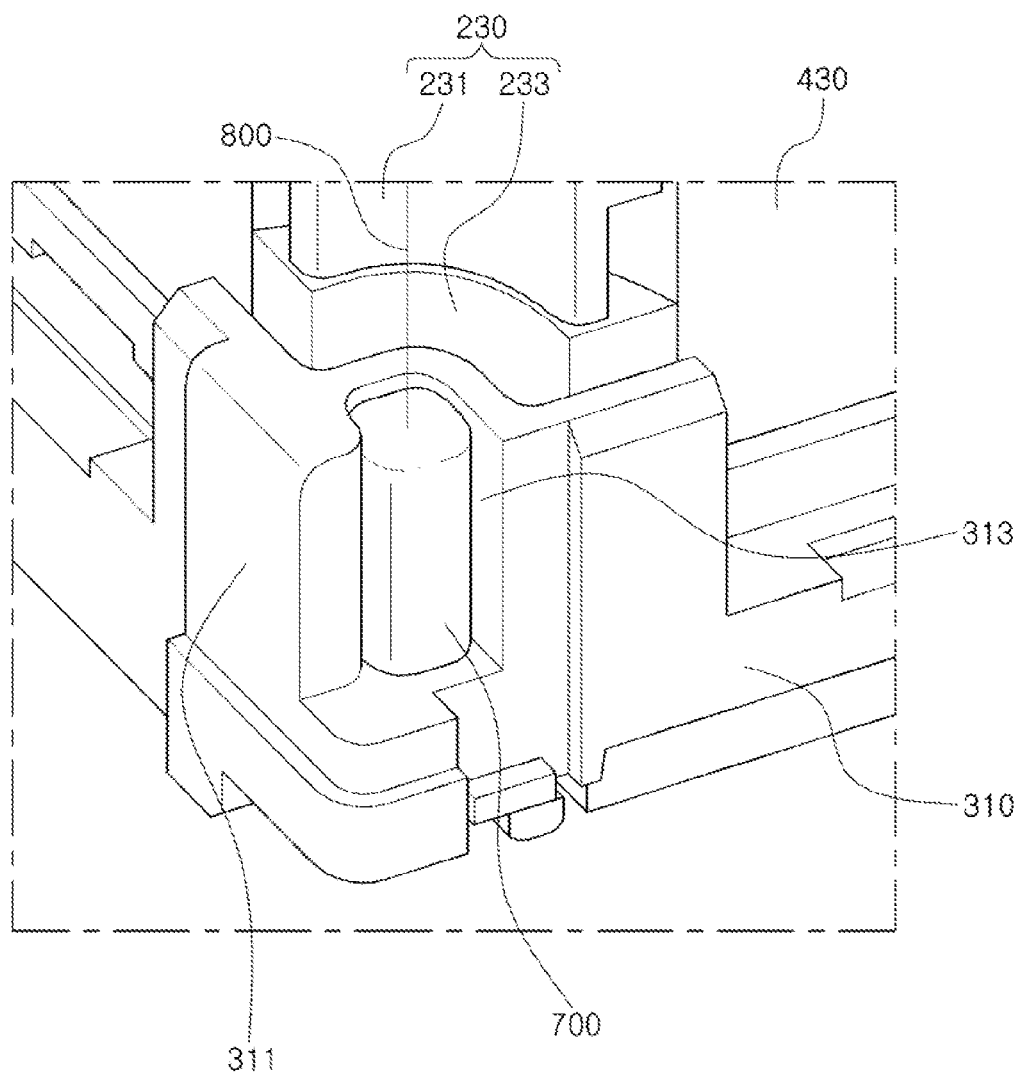
FIG. 4 is a diagram showing a position in which a damper part is disposed in the camera module, according to an example.

Damper parts 700 enclose at least a portion of the suspension wires 800. Therefore, when the driving part 200 is driven, the dampers 700 dampen vibrations of the suspension wire 800. FIG. 3 is a partially assembled perspective view of the camera module 10, and FIG. 4 is a diagram showing a position in which a damper part 700 is disposed in the camera module 10, according to an example.

The damper part 700 will be described with reference to FIGS. 3 and 4.

As described above, the driving part 200 is configured to be biaxially driven in the directions (X and Y directions) perpendicular to the optical axis direction (Z direction) by the lens driver 400, in a state in which the driving part 200 is supported by the suspension wires 800. In this case, when a frequency of the driving force of the lens driver 400 coincides with a natural frequency of the driving part 200 and the suspension wire 800, a resonance phenomenon may occur. Further, when the driving force of the lens driver 400 is not applied to a center of the driving part 200, a rolling moment may be generated in the driving part 200, and thus the driving part 200 may rotate. Therefore, to prevent the above resonance phenomenon and the rotational motion, the camera module 10 includes the damper part 700.

The damper part 700 is disposed in a space formed between the fixed part 300 and the case 100. That is, a predetermined space enclosed by an outer surface of the fixed part 300 and an inner surface of the case 100 may be formed between the outer surface of the fixed part 300 and the inner surface of the case 100, and the damper part 700 may be formed within the space.

For example, the frame 310 includes an extension part 311 extending in the optical axis direction (Z direction) from the frame 310, and the damper part 700 is provided in the extension part 311. Multiple extension parts 311 may be respectively formed in each corner of the frame 310 and spaced apart from the driving part 200 in the directions (X and Y directions) perpendicular to the optical axis direction (Z direction) in consideration of a driving distance of the driving part 200.

The extension part 700 includes an accommodating groove 313 which is concave from a side surface of the extension part 311 in the directions (X and Y directions) perpendicular to the optical axis direction (Z direction), and the suspension wire 800 and the damper part 700 are disposed in the accommodating groove 313. The damper part 700 encloses the suspension wire 800.

The space is formed between the extension part 311 and the case 100 by the accommodating groove 313 and is sealed in the directions (X and Y directions) perpendicular to the optical axis direction (Z direction). For example, when the case 100 is coupled to the fixed part 300, the accommodating groove 313 is sealed by the case 100 in the directions (X and Y directions) perpendicular to the optical axis direction (Z direction).

That is, an inner surface of the case 100 contacts a side surface of the extension part 311, and thus the accommodating groove 313, which is concave and provided on the side surface of the extension part 311, is sealed in the directions (X and Y directions) perpendicular to the optical axis direction (Z direction). Therefore, the damper part 700 is stably maintained in the accommodating groove 313 and may not leak externally.

The damper part 700 may include a gel material having viscosity. At least a portion of the suspension wire 800 is inserted into the damper part 700, and thus, when the driving part 200 is driven by the driving force of the lens driver 400, the portion of the suspension wire 800 inserted in the damper part 700 may be moved within the damper part 700. Accordingly, when the suspension wire 800 is moved by the lens driver 400, the damper 700 generates a frictional resistance to the movement of the suspension wire 800, and thus an amplitude of the movement of the suspension wire 800 may be reduced. Therefore, vibrations of the suspension wire 800 are dampened by the damper part 700, thereby preventing the resonance phenomenon and the rotational motion of the suspension wire 800.

As shown in FIG. 3, the damper part 700 may be applied to the accommodating groove 313 before the case 100 of the camera module is assembled.

For example, the damper part 700 is applied to the accommodating groove 313 to enclose at least a portion of the suspension wire 800 while the suspension wire 800 is disposed in the accommodating groove 313. When the application of the damper part 700 is completed, the case 100 is coupled to the fixed part 300 to seal the accommodating groove 313 in the directions (X and Y directions) perpendicular to the optical axis direction (Z direction), thereby preventing the damper part 700 from leaking externally.

As set forth above, according to the examples disclosed herein, the camera module may prevent a resonance phenomenon from occurring when an image stabilization function is performed. Further, the camera module may prevent the driving part from rotating when the image stabilization function is performed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a driving part comprising a lens module;
   a fixed part comprising a frame, the frame comprising a groove formed in a side surface of the frame;
   a suspension wire comprising a first end fixed to the fixed part and a second end fixed to the driving part;
   a damper part surrounding at least a portion of the suspension wire and disposed in the groove; and
   a case configured to be coupled to the fixed part to surround the driving part and retain the damper part in the groove,
   wherein, when the case is coupled to the fixed part, the damper part is disposed in a space enclosed by an outer surface of the fixed part and an inner surface of the case.

2. The camera module of claim 1, wherein the damper part comprises a gel.

3. The camera module of claim 1, wherein the damper part is configured to dampen vibration of the suspension wire.

4. The camera module of claim 1, wherein:
   the frame further comprises a window through which light is transmitted; and
   the fixed part further comprises a first substrate comprising an image sensor mounted on the first substrate and coupled to the frame.

5. The camera module of claim 1, wherein the fixed part is spaced apart from the driving part.

6. The camera module of claim 4, wherein the first end of the suspension wire is fixed to the first substrate.

7. The camera module of claim 4, wherein:
   the frame comprises an extension part extending in an optical axis direction from the frame; and
   the groove is disposed in the extension part.

8. The camera module of claim 7, wherein the extension part is spaced apart from the driving part in a direction perpendicular to the optical axis direction.

9. The camera module of claim 7, wherein the groove is disposed in the extension part and is concave from a side surface of the extension part in a direction perpendicular to the optical axis direction.

10. The camera module of claim 7, wherein the extension part is disposed in a corner of the frame.

11. The camera module of claim 9, wherein, when the case is coupled to the fixed part, the case is coupled to the side surface of the extension part, and the groove is sealed by the case in the direction perpendicular to the optical axis direction.

12. A camera module, comprising:
    a driving part comprising a lens module;
    a fixed part comprising a frame, the frame comprising a groove formed in a side surface of the frame;
    a suspension wire comprising a first end fixed to the fixed part and a second end fixed to the driving part;
    a damper part surrounding at least a portion of the suspension wire and disposed in the groove; and
    a case configured to be coupled to the fixed part to surround the driving part and retain the damper part in the groove,
    wherein, when the case is coupled to the fixed part, the damper part is disposed in a space formed between the fixed part and the case.

13. A camera module, comprising:
    a driving part comprising a lens module;
    a fixed part spaced apart from the driving part;
    a lens driver configured to drive the driving part in a direction perpendicular to an optical axis direction;
    a suspension wire supporting the driving part;
    a case coupled to the fixed part and surrounding the driving part; and
    a damper part retained, by the case, in a space provided between the fixed part and the case, and surrounding at least a portion of the suspension wire,
    wherein, when the case is coupled to the fixed part, the damper part is disposed in the space enclosed by an outer surface of the fixed part and an inner surface of the case.

14. The camera module of claim 13, wherein the damper part comprises a viscous gel.

15. The camera module of claim 13, wherein the suspension wire is configured to supply power to the lens driver.

16. The camera module of claim 13, wherein:
    the lens driver comprises a first coil configured to receive power to perform an auto-focus or zoom function, a second coil configured to receive power to perform an image stabilization function, and a magnet facing the first coil and the second coil; and
    the suspension wire is configured to supply power to the first coil.

* * * * *